United States Patent [19]

Casey

[11] 4,022,646
[45] May 10, 1977

[54] PROCESS FOR THE MANUFACTURE OF CO-ORIENTED LAMINATED ETHYLENE POLYMER FILMS

[75] Inventor: Kenneth Casey, North Bay, Canada

[73] Assignee: Du Pont of Canada Limited, Montreal, Canada

[22] Filed: Feb. 25, 1974

[21] Appl. No.: 445,609

Related U.S. Application Data

[63] Continuation of Ser. No. 202,557, Nov. 26, 1971, abandoned.

[52] U.S. Cl. .............................. 156/164; 156/229; 156/309; 156/306; 156/334; 427/385 B; 427/407 E; 428/218; 428/516
[51] Int. Cl.² ....................................... B32B 31/08
[58] Field of Search .......... 156/229, 334, 494, 495, 156/496, 164, 309, 306, 311; 161/252, 402; 425/66; 427/385 B, 407 E; 428/218

[56] References Cited

UNITED STATES PATENTS

| | | | |
|---|---|---|---|
| 2,983,704 | 5/1961 | Roedel | 156/306 |
| 3,187,982 | 6/1965 | Underwood et al. | 229/51 |
| 3,208,100 | 9/1965 | Nash | 26/63 |
| 3,223,761 | 12/1965 | Raley | 264/95 |
| 3,351,697 | 11/1967 | Hufnagel et al. | 264/288 |
| 3,448,995 | 10/1967 | Baker et al. | 428/218 |
| 3,490,972 | 1/1970 | Rogers | 156/306 |

*Primary Examiner*—Charles E. Van Horn
*Assistant Examiner*—J. J. Gallagher

[57] ABSTRACT

A process is disclosed for the co-orientation lamination of at least one ethylene polymer film (A) with at least one ethylene polymer film (B). The polymer of film (A) is of higher melting point than the polymer of film (B). The preferred ethylene polymers are ethylene homopolymers and ethylene-butene-1 copolymers. The laminates produced may be heat sealed.

9 Claims, No Drawings

PROCESS FOR THE MANUFACTURE OF CO-ORIENTED LAMINATED ETHYLENE POLYMER FILMS

This is a continuation of application Ser. No. 202,557, filed Nov. 26, 1971, now abandoned.

The present invention relates to a process for the essentially simultaneous orientation and lamination, referred to hereinafter as co-orientation lamination, of two or more ethylene polymer films. In particular, the invention relates to the co-orientation lamination of a low density ethylene polymer film and a high density ethylene polymer film.

In packaging applications using thermoplastic films, for example ethylene polymer films, it is usually necessary to seal the film during the packaging operation. This may be accomplished by using adhesives or by using heat sealing techniques; the particular sealing technique chosen may depend on the properties of the thermoplastic film, the packaging application and the packaging technique being used.

The use of heat sealing techniques on oriented film may result in the loss of film orientation in the vicinity of the heat seal. Heat sealed oriented films may therefore exhibit inferior and unacceptable film appearance and properties. In order to heat seal oriented film and obtain acceptable product properties, it may be necessary to apply to the oriented film a coating of melting point less than about the de-orientation temperature of the oriented film and to heat seal at a sealing temperature which is also less than the de-orientation temperature of the oriented film. The sealing of oriented films may also be accomplished with adhesives.

A suitable heat sealable coating may be applied by using co-extrusion techniques such as is described in Canadian Pat. No. 692,510 issued 11th Aug. 1964 to W. F. Underwood and G. R. Cotten for the production of tear tapes. Heat sealable coatings may also be applied using solvent coating techniques, such as are used for polyvinylidene chloride coatings, or by adhesive lamination techniques. Such techniques are well known.

Other techniques have been disclosed for the lamination of two or more films of the same polymer in the production of thicker films having optical and physical properties superior to non-laminated films of the same gauge. The techniques disclosed include the lamination of oriented films and the combined lamination/orientation of films.

Heat sealable oriented films may be used in packaging applications, to produce cross-lapped films, and, when slit into tapes, in the promotion of weave stabilization of woven tape structures.

It is an object of the present invention to provide a film comprising a thin heat sealable coating on an oriented ethylene polymer film in a one-step process and in an economical manner.

It is another object of the present invention to apply said coating by a process in which the adhesion of the coating to the base film may be readily controlled.

It has now been found that a heat sealable coating of melting point lower than that of the polymer of the base film may be applied by the co-orientation lamination process described hereinafter. In particular, a layer of a low density ethylene polymer may be applied to a high density ethylene polymer base film.

Accordingly, the present invention provides a process for the manufacture of an oriented ethylene polymer film laminate comprising the steps of (1) bringing together in face to face engagement at least one ethylene polymer film (A) with at least one ethylene polymer film (B) and (2) while maintaining the films in face to face engagement, orienting said films at a temperature below the melting point of the polymer of film (A), the polymer of film (A) being of higher melting point than the polymer of film (B).

In one embodiment of the present the heat sealable oriented ethylene polymer film may be manufactured from one of each of ethylene polymer film (A) and ethylene polymer film (B).

In a further embodiment of the invention, the ethylene polymer of film (A) may be a high density (0.950–0.960) ethylene polymer and the ethylene polymer of film (B) may be a low or medium density (0.910–0.945) ethylene polymer.

In yet another embodiment of the invention, the ethylene polymer film (B) comprises not more than 25% of the heat sealable oriented ethylene polymer film.

The process of the present invention may be carried out on apparatus used for the uniaxial orientation of film. Such apparatus, an example of which is given in Canadian Pat. No. 704,804 which issued to J. C. Nash on 2nd Mar. 1965, essentially comprises means for bringing two or more films into contact, a "hot" roll and, in close proximity, a "cold" roll. The temperatures of the hot and cold rolls are variable and capable of being regulated, and the gap between the rolls may be varied. The hot roll is usually operated at an elevated temperature to facilitate the orientation process and to facilitate the production of the desired properties in the orientated product. The operating temperatures are usually near or above the melting point of the film polymer. The cold roll is usually operated at a temperature less than that of the hot roll; the temperature of the cold roll may be substantially above ambient temperature. The apparatus may also have means for the heat relaxation of the oriented film, said means may comprise two additional rolls as is disclosed in Canadian Pat. No. 704,804.

In the process of the present invention, the films to be co-orientation laminated are brought into contact with each other and with the hot roll. The hot roll is usually operated at a temperature less than the temperature that would result in the melting of the higher melting point ethylene polymer film, film (A), under the process conditions. Process problems may occur if the process is operated with the temperature of the hot roll such that the polymer of film (A) is at a temperature near the melting point of the polymer. The temperature of the hot roll is an important variable in determining the adhesion between the films of the oriented laminate produced by the process. At high hot roll temperatures, high adhesion of the films being co-orientation laminated may be obtained while at relatively low hot roll temperatures little or no adhesion, and therefore little or no lamination of the films, may be obtained. The adhesion obtained may be such that the laminate is not separable by physical means into the films use in the manufacture of the laminate. The adhesion between the films of the laminate is preferably at least 50 grams/inch.

The cold roll temperature may also have an effect on the adhesion obtained. Cold roll temperatures near the softening point of the ethylene polymers of the laminate may result in higher adhesion, especially because of lower polymer crystallinity in the interface region of the bond formed during lamination. Similarly, cold roll temperatures substantially lower than the polymer softening point may result in lower adhesion.

The adhesion obtained may also be affected by the orientation rate. The orientation rate is determined by the orientation ratio and by distance between the hot and cold rolls in which substantially all of the orientation occurs; this distance may be referred to as the roll gap. The adhesion of the laminate may increase as the orientation ratio increases and as the roll gap decreases. Suitable roll gap sizes may be 0.05–1.00 inches and in particular 0.005–0.050 inches.

The film gauge of the film in contact with the hot roll may affect adhesion in so far as heat must be conducted from the hot roll through the film contacting the hot roll to the interface of the films being laminated. Increasing film gauge may necessitate an increase in hot roll temperature in order that the desired interface temperature may be obtained.

The ethylene polymers that may be used in the manufacture of film for the co-orientation lamination process may be manufactured by known processes. The polymers may be ethylene homopolymers or copolymers of ethylene and a higher $\alpha$-olefin such as ethylene-butene-1 and ethylene-vinyl acetate copolymers.

The ethylene polymers must be capable of being manufactured into film. Techniques for the manufacture of film from ethylene polymers are known. These techniques include flat film extrusion processes, such as water quench or cold roll quench processes, and blown film processes with or without internal and/or external cooling. The melt index of the ethylene polymers use in film manufacture are preferably less than about 10, this level of melt index not being a critical feature of the invention except for the requirement that the polymers must be capable of being made into film. Similarly, it is preferred that the melt index of the polymer be above about 0.1. Polymer melt index may be obtained using ASTM test method D-1238.

For the manufacture of the film of higher melting point, film (A), the preferred ethylene polymers are high density (0.950–0.960) ethylene polymers, especially ethylene homopolymers. For the lower melting point film, film (B), low density (0.910–0.930) ethylene polymers, such as for example, an ethylene-butene-1 copolymer or an ethylene homopolymer, are preferred.

The ethylene polymers used in the process of the present invention may contain additives such as stabilizers, fillers such as clays, and pigments such as carbon black, titanium dioxide. The individual films used in the process may be manufactured from ethylene polymers containing different additives.

In the process of the present invention, the films to be laminated are brought into contact with each other and with the hot roll of the orientation apparatus. It is an aspect of the present invention that one film, film (A), must be of higher melting point and must be heated to a temperature not exceeding the melting point of the polymer of this film. The co-orientation lamination process may be operated with either type of film, i.e., film (A) or film (B) in contact with the hot roll. It is however, preferred that the film of higher melting point be brought into contact with the hot roll. If film (B) contacts the hot roll, the temperature of the hot roll required to operate the process in the desired manner may be such that the polymer of film (B) melts or becomes soft while in contact with the hot roll which may cause process problems such as adherence of the polymer to the hot roll and/or poor film quality. By contacting the hot roll with film (A), such problems may be avoided.

The orientation ratio is preferably at least 1.5 and in particular, 3.0 to 7.0. High orientation ratios may result in process difficulties such as film breakage. Moreover, it is known in the art that the maximum orientation of an ethylene polymer film that may be attained in the absence of significant process difficulties such as film breakage may depend on the method of manufacture of the polymer. Such properties of the ethylene polymer may be a factor in determining the maximum orientation ratio in the process of the present invention.

The co-orientation process described herein must be operated with at least one film of each of ethylene polymer film (A) and film (B). In particular, the process may be operated with equal numbers of each film type, especially one of each of films (A) and (B). Under the process conditions of the present invention, operation of the co-orientation process to laminate film combinations in which two films of the higher melting polymer, i.e., two films (A), are brought into contact may result in little or no adhesion between these two films. In an aspect of the invention, film (A) and/or film (B) may be a composite ethylene polymer film such as a high density ethylene polymer film coated with a low density ethylene polymer film. Such films may hve been previously made by the process of the present invention. In another aspect of the invention, one ethylene polymer film (B) may be simultaneously co-orientation laminated to two ethylene polymer films (A) such that film (B) is laminated between the two films (A). In yet another aspect of the invention, film (B) may be simultaneously co-orientation laminated to film $(A_1)$ and to another ethylene polymer film, film $(A_2)$. The ethylene polymer of films $(A_1)$ and $(A_2)$ may be different while still being of higher melting point than the polymer of film (B). The polymer of either film (A) or film (B) may be a blend of polymers.

The gauges of the films used may be varied over a wide range and are primarily determined by the gauge and degree of orientation of the final product, the product end use, and the orientation machine capabilities. In one embodiment, the flow melting point film is of substantially lower gauge than the film of higher melting point. For example, the gauge of the lower melting point film may be less than 25% and in particular less than 15% of the gauge of the higher melting point film. Such thin films may be manufactured by known film processes or the films may be obtained by orientation of films of higher gauge.

The co-oriented laminate produced by the process of the present invention may be treated in a heat relaxation process such as is described in Canadian Pat. No. 704,804. The use of a heat relaxation process may be a factor in determining the temperature of the cold roll used in the co-orientation lamination process described herein.

The invention is further illustrated by the following examples.

EXAMPLES

A series of co-orientation lamination trials were carried out on an apparatus for the uniaxial orientation of polymer films. The apparatus comprises means for bringing the films into contact with a hot roll, a cold roll and wind-up means. The films were contacted with the hot roll and subsequently with the cold roll, the gap between the hot and cold being approximately 0.005 inches greater than the sum of the gauges of the films being co-orientation laminated. The operating conditions used are given in Table I. Details of the polymers are given in Table II. The films were manufactured using the process described in Canadian Pat. No. 579,650 which issued to G. B. Dyer and W. P. Heinstein on 14th July 1959.

In all the examples the co-orientation laminated film produced could not be separated by physical means into the individual films used in the lamination process.

TABLE I

| Example | Temperatures (C°) | | Co-Orientation Lamination Data | | | Co-orientation No. 2 | Laminated* No. 3 |
|---|---|---|---|---|---|---|---|
| | Hot Roll | Cold Roll | Cold Roll Speed (fpm) | Orientation Ratio | Films No. 1*** | | |
| 1 | 127 | 102 | 24 | 4:1 | 59C (4.5) | 11K (1.0) | |
| 2 | 127 | 88 | 35 | 3.5:1 | 59C (4.5) | 3006 (0.4) | |
| 3 | 127 | 99 | 24 | 4:1 | 19A (4.5) | 11K (1.0) | |
| 4 | 127.5 | 88 | 27 | 6:1 | 79D (4.5) | 11K (1.5) | |
| 5 | 120.5 | 105 | 36 | 4:1 | 96A (4.5) | 11K (1.0) | |
| 6 | 119 | 88 | 36 | 3:1 | 96A (4.0)** | 3006 (0.4) | |
| 7 | 120.5 | 102 | 24 | 4:1 | 96A (4.5) | 11K (1.0) | |
| 8 | 119.5 | 88 | 48 | 4:1 | 14B (4.5) | 11K (1.0) | |
| 9 | 132 | 105 | 21 | 7:1 | 59C (4.5) | 96A (4.5) | 59C (4.5) |
| 10 | 123 | 105 | 36 | 6:1 | 96A (4.5) | 11K (1.0) | 96A (4.5) |

*Figure in parenthesis is film gauge in mil. Film polymer is identified only by code number (see Table II)
**contained 2% carbon black
***film No. 1 contacts hot roll, film No. 2 contacts film No. 1

TABLE II

| Polymer** | Density | Melt Index | Stress Exponent* |
|---|---|---|---|
| SCLAIR 11K | 0.920 | 1.6 | 1.35 |
| SCLAIR 14B | 0.935 | 1.85 | 1.30 |
| SCLAIR 96A | 0.945 | 0.40 | 1.80 |
| SCLAIR 59C | 0.960 | 0.40 | 1.80 |
| SCLAIR 19A | 0.960 | 0.75 | 1.80 |
| SCLAIR 79D | 0.956 | 1.00 | 1.45 |
| Chemplex 3006 | 0.926 | 2.00 | — |

*Stress exponent is a measure of melt viscosity and is related to molecular weight distribution. Stress exponent is discussed in Canadian Patent No. 664,699 to C. E. Ashby, S. P. Foster and E. T. Pieski, issued 11th June 1963 and in Canadian Patent No. 771,260 to D. J. Ryan & B. J. Starkey, issued 7th November 1967.
**SCLAIR is the registered trademark of Du Pont of Canada for its polyolefins. Chemplex 3006 polyethylene is obtainable from the Chemplex Co., Rolling Meadows Illinois 60008, U.S.A.

The embodiment of the present invention in which an exclusive property or privilege is claimed are defined as follows:

1. A process for the manufacture of a co-orientation laminated ethylene polymer film laminate from separate films comprising the steps (1) bringing together in face to face engagement at least one ethylene polymer film (A) of a density in the range of about 0.950 to about 0.960 with at least one separate ethylene polymer film (B) of a density in the range of about 0.910 to about 0.945, the polymer of film (A) being of a higher melting point than the polymer of film (B), and (2) essentially simultaneously orienting and laminating said engaged films at a temperature below the melting point of the polymer of film (A) by means of contact with a first roll and subsequently with a second roll, the temperature of the first roll being higher than the temperature of the second roll, with film (A) being in contact with said first roll.

2. The process of claim 1 in which the surface speed of the second roll is at least 1.5 times the surface speed of the first roll.

3. The process of claim 2 in which the distance between the first roll and the second roll is in the range of 0.005 to 1.0 inches.

4. The process of claim 3 in which the polymer of film (B) is of melt index in the range of about 0.1 to about 10 and is selected from the group consisting of ethylene homopolymers and ethylene-butene-1 copolymers.

5. The process of claim 4 in which the polymer of film (A) is an ethylene homopolymer of melt index in the range about 0.1 to about 10.

6. The process of claim 2, in which the surface speed of the second roll is 3.0 to 7.0 times the surface speed of the first roll.

7. The process of claim 1, in which there is one ethylene polymer film (A) and one ethylene polymer film (B).

8. The process of claim 1, in which there is one ethylene polymer film (B) and not more than two ethylene polymer films (A) in alternate arrangement.

9. The process of claim 1, in which the gauge of film (B) is not more than 25% of the gauge of film (A).

* * * * *